United States Patent [19]
Carduck et al.

[11] Patent Number: 5,290,496
[45] Date of Patent: Mar. 1, 1994

[54] PROCESS FOR THE PRODUCTION OF GRANULES OF A DETERGENT

[75] Inventors: Franz-Josef Carduck, Haan; Hubert Pawelczyk; Wilfried Raehse, both of Dusseldorf; Jochen Jacobs, Wuppertal, all of Fed. Rep. of Germany

[73] Assignee: Henkel Kommanditgesellschaft auf Aktien, Duesseldorf, Fed. Rep. of Germany

[21] Appl. No.: 927,677

[22] PCT Filed: Feb. 28, 1991

[86] PCT No.: PCT/EP91/00371
§ 371 Date: Nov. 9, 1992
§ 102(e) Date: Nov. 9, 1992

[87] PCT Pub. No.: WO91/13678
PCT Pub. Date: Sep. 19, 1991

[30] Foreign Application Priority Data
Mar. 9, 1990 [DE] Fed. Rep. of Germany .... 4007601.6

[51] Int. Cl.$^5$ .............................................. B29C 47/12
[52] U.S. Cl. .............................. 264/142; 264/211.11; 425/311; 425/382.4; 425/464
[58] Field of Search ............... 264/117, 118, 141, 142, 264/177.11, 211.11; 425/198, 308, 311, 382.4, 464, 382.2, 461, 462

[56] References Cited

U.S. PATENT DOCUMENTS

| | | | |
|---|---|---|---|
| 2,900,668 | 8/1959 | Hübner et al. | 264/142 |
| 2,902,715 | 9/1959 | Norman | 425/DIG. 230 |
| 3,060,511 | 10/1962 | Parmella | 264/142 |
| 3,174,183 | 3/1965 | Siegel | 425/461 |
| 3,391,657 | 7/1968 | Reese | 425/DIG. 230 |
| 3,762,850 | 10/1973 | Werner et al. | 425/382.2 |
| 3,830,027 | 8/1974 | Paisley et al. | 204/74 |
| 3,849,327 | 11/1974 | DiSalvo et al. | 252/109 |
| 3,867,082 | 2/1975 | Lambertus | 425/382.2 |
| 3,886,098 | 5/1975 | DiSalvo et al. | 252/540 |
| 3,938,925 | 2/1976 | Laas | 425/382.2 |
| 3,949,039 | 4/1976 | Yamamoto et al. | 264/142 |
| 4,137,032 | 1/1979 | Honnaker et al. | 425/382.2 |
| 4,269,722 | 5/1981 | Joshi et al. | 252/90 |
| 4,707,290 | 11/1987 | Seiter et al. | 252/140 |
| 4,887,957 | 12/1989 | Ohta et al. | 425/382.2 |
| 5,002,691 | 3/1991 | Bolkan et al. | 252/186.25 |
| 5,158,730 | 10/1992 | Pawelczyk et al. | 264/141 |

FOREIGN PATENT DOCUMENTS

0149264 7/1985 European Pat. Off. .
3444960 6/1986 Fed. Rep. of Germany .

Primary Examiner—Jay H. Woo
Assistant Examiner—Robert B. Davis
Attorney, Agent, or Firm—Ernest G. Szoke; Wayne C. Jaeschke; Daniel S. Ortiz

[57] ABSTRACT

The invention is a process for manufacturing granules of a washing or cleaning agent from an at least partly solid mixture of granules by admixing plasticizers or lubricants with the granules and passing the mixture through a mixing zone at an elevated temperature and pressure to form a plastic flowable material and passing the plastic flowable material through a plurality of orifices of small diameter and cutting the extruded material at predetermined lengths to form a particulate washing or cleaning agent.

30 Claims, 6 Drawing Sheets

PROCESS FOR THE PRODUCTION OF GRANULES OF A DETERGENT

FIELD OF THE INVENTION

This invention relates to a process for the production of granules of a detergent, more particularly a laundry detergent, from a mixture of at least partly solid fine-particle ingredients.

In the field of fine-particle, solid and free-flowing domestic and institutional detergents, more particularly in the field of powder-form laundry detergents, there is a trend towards the manufacture both of products having increased apparent densities and of relatively highly concentrated mixtures of ingredients.

RELATED ART

Granules containing carriers and liquid or paste-form surfactants adsorbed therein, more particularly corresponding nonionic surfactants, are known from the relevant prior art literature. In the processes which have been developed for their production, the liquid or molten nonionic surfactant is sprayed onto a previously spray-dried powder or is mixed with a powder-form carrier under granulating conditions. Proposed carriers include loose, more particularly spray-dried, water-soluble detergent-range salts or salt mixtures, for example phosphates, silicates and/or perborates, and water-insoluble compounds, for example zeolites, bentonites and/or fine-particle silicon dioxide. Absorbent carrier granules of this type, which have been developed in particular for the adsorption of nonionic surfactants and which are generally produced by spray drying, are described, for example, in U.S. Pat. Nos. 3,849,327, 3,886,098, 3,830,027 and 4,269,722. U.S. Pat. No. 4,707,290 describes a granular adsorbent which is said to be capable of absorbing large quantities of liquid to paste-form detergent ingredients and which is produced by spray drying. It has been found in practice that products of this type can cause difficulties during the dispensing phase insofar as they do not dissolve completely and leave residues behind. Not only do the particles in question themselves show impaired dispensing behavior, they can also affect the solubility and dispensing behavior of the other powder-form detergent components. The result is that a basically readily dispensable powder mixture as a whole develops poor dispensing behavior if it additionally contains powder components of the type in question in the mixture. Further proposals of this nature can be found, for example, in DE 34 44 960-A1 and in EP 149 264.

All these proposals are relatively complicated. An aqueous slurry of the carrier is first prepared and then has to be converted by spray drying into a granular, porous intermediate product. In a second stage of the process, the carrier granules are sprayed with the liquid component, more particularly nonionic surfactant. The nonionic surfactant diffuses in with delay and adsorbates containing a high percentage of nonionic surfactants are only sufficiently free-flowing after a certain treatment and standing time. If, by contrast, powder-form intermediates are used, for example in the form of finely crystalline zeolites or crystalline water-soluble carrier salts, and if they are treated with liquid or molten nonionic surfactants under granulating conditions, the granules obtained generally show a very uneven particle size distribution and reduced flow properties. Above all, however, the absorption capacity of these granules for nonionic surfactants is comparatively limited if they are not to lose crucial properties, more particularly their free flow.

The present invention seeks on the one hand to provide solid, free-flowing granules of detergent ingredients which can be predetermined in regard to their particular shape and, at the same time, to enable distinctly increased apparent densities to be established. In addition and in conjunction therewith, however, the invention also seeks to address another problem area, more particularly from the field of storable, free-flowing detergents, especially laundry detergents. More particularly, the invention seeks to provide access to pourable free-flowing detergent concentrates which retain their flow properties, even in the event of storage over prolonged periods and under difficult conditions.

The invention seeks in particular to provide laundry detergents in granule form which, for apparent densities of up to about 1000 g/l, are distinguished by a predeterminable, uniform granulometry and good flow properties and which, in practice, can readily replace the laundry detergent powders typically used today and in the recent past. With its granules produced in a novel manner, the invention covers both the range of ready-to-use multicomponent mixtures for the stated applications in the form of uniformly mixed granules and also intermediate products for the field of application in question which, to complete the formulation, still have be mixed with other constituents of the particular detergent and/or cleaning preparation in question. Accordingly, the invention also encompasses mixtures of the granules produced by the process according to the invention described hereinafter and other active components of the particular global formulation which are subsequently applied to or mixed with the granules.

In the production of the granules, it is important, particularly in the interests of a high apparent density, to obtain a product of uniform external appearance. In addition, the product also has to be dust-free and homogeneous in its composition. In addition, in order to obtain particularly high apparent densities, the granules should have relatively small dimensions of the order of 1 mm. These small dimensions also promote the solubility of the granules in water. The granules are preferaly spherical in shape which can be achieved by subjecting the rodlet-like granules obtained in accordance with the invention to an aftertreatment which will not be described here.

Accordingly, the problem addressed by the present invention was to provide a process of the type mentioned at the beginning which would enable uniform, relatively small granules having the properties mentioned above to be obtained in a particularly economical manner. A particularly important criterion in this regard is a high throughput for a minimal space requirement and a consistently high quality of the product.

BRIEF DESCRIPTION OF THE INVENTION

According to the invention, the solution to this problem is characterized in that plasticizers and/or lubricants are added to the mixture, the molding compound thus obtained is extruded under a pressure of at least 25 bar through a plurality of bores which have an inlet-end zone of relatively large diameter and and an outlet-end zone of smaller diameter, the length-to-diameter ratio in the inlet-end zone being from 1.5 to 6:1 and, in the outlet-end zone, from 0.3 to 2:1 and in that the issuing strands of material are cut transversely to predetermined lengths immediately after leaving the bores. It is important the bores have the nozzle-like form mentioned because uniform and solid granules relatively small in diameter are thus obtained under the pressures mentioned without blockage of the bores. It is of particular advantage that scale-up is readily possible simply by increasing the number of identical bores.

Comparatively limited quantities of liquid phase(s) are used in the process according to the invention. However, the mixture is mixed and kneaded so intensively under comparatively high pressures that the previously dry-looking mixture is converted into a compacted, plasticized and extrudable compound. This process step is similar in its external appearance to the mastication of rubber-containing mixtures or even to the plasticization of polymer granules into moldable compounds. Just as in their case, a limited increase in the temperature of the compound can promote the homogenization and compaction in accordance with the invention of the dry-looking mixture initially obtained into the moldable compound. The capacity of the limited quantities of liquid in the mixture for softening plasticization increases with increasing temperature. The intensive mixing process, for example by kneading, can itself lead to the desired increase in temperature. If necessary, however, the temperature can also be regulated as required from outside. Primarily, however, this desired state is determined by the total amount of liquid used in the mixture and by the water absorption capacity of the fine-particle, solid components of the mixture. In general, highly concentrated surfactant pastes or gels or even the above-mentioned highly concentrated, more particularly aqueous, polymer preparations will be used in quantities of no more than about 12% by weight and, preferably, in quantities of at most about 10% by weight, based on the mixture as a whole. Distinctly smaller quantities, for example of surfactant paste, lead to good results, for example in the production of laundry detergents. For example, a tower powder/carrier bead mixture with or without added sodium perborate (monohydrate and/or tetrahydrate) can be worked up by addition of 2 to 5% by weight water and 4 to 8% by weight of a 55 to 60% ABS paste into a compound of suitable consistency for further processing by molding.

DETAILED DESCRIPTION OF THE INVENTION

Processing is carried out as follows:

A premix of the solid components and any limited quantities of liquid components used is first prepared in known manner. Thus, tower powders produced by spray drying and also, quite simply, the particular components selected for the mixture may be mixed together as pure materials in finely divided form. Depending on the quality of the materials, the requisite quantity of liquid phase and then the plasticizer and lubricant selected in accordance With the invention are mixed in, preferably in the form of an aqueous paste or gel. If desired, other solid components may now also be added to the premix. The premix is then briefly mixed, the respective components being selected so that a preferably free-flowing premix suitable for charging a homogenizing unit is obtained.

Kneaders of any type, for example twin-screw kneaders, are preferably used as the homogenizing unit. It can be useful to adjust the material to be molded to moderate temperatures, for example to temperatures of 45° to 60° C., in this homogenizing step. Under the shearing effect of the kneading unit, the premix is compactingly plasticized and, immediately afterwards, is extruded through the above-mentioned bores to form fine strands. As they are formed, the strands are cut or chopped into raw granules of the required particle size. According to the invention, the following process is particularly suitable for carrying out this step:

The free-flowing premix is delivered, preferably continuously, to a twin-screw kneader/extruder of which the housing and the extruder/granulation head are heated to the predetermined extrusion temperature, i.e. for example to around 45° to 50° C. Under the shearing effect of the extruder screws, the premix is compacted, plasticized and subsequently extruded through the above-mentioned bores to form fine strands which, after leaving the bores, are size-reduced to cylindrical pellets by means of a rotating chopping blade. This process may be described as hot chopping granulation in contrast to the wet chopping granulation used in the processing of melts, for example molten plastic. The diameter of the bores and the length to which the strands are cut are adapted to the size selected for the granules.

Further standardization of the pressure acting on the various bores and, hence, standardization of the shape and consistency of the granules to be produced can be achieved if the inlet-end zone of the bores is chamfered conically towards the inlet. This reduces the turbulence caused by the webs remaining between the inlets of the bores. The turbulence in question is even further reduced if the interval between the bores is so narrow that the edges of the inlets of adjacent bores touch or overlap one another. If, therefore, a suitable chamfer and a suitable distance between the individual bores are selected, it is possible to ensure that only chamfers each associated with exactly one bore are present at the inlet end between the bores instead of webs having end faces extending perpendicularly to the direction of flow. Backflows, turbulence and dead zones in the flow of material are largely suppressed or even eliminated by this measure.

The process according to the invention is further improved if the transition zone between the inlet-end zone and the outlet-end zone of the bores is inclined at an angle of 20° to 85°, preferably at an angle of 40° to 80° and, more preferably, at an angle of 45° to 75° towards the plane perpendicular to the longitudinal axis of the bores. Further standardization of the granules formed is achieved in this way.

In another embodiment, the diameter of the outlet-end zone of the bores is between 0.5 and 5 mm and, more particularly, between 1.0 and 2.5 mm. The diameter of the inlet-end zone is also of importance and is advantageously between 0.8 and 4 mm and, more particularly, between 1.2 and 3 mm.

The smaller the diameter of the bores, the more important their internal geometry is in ensuring that the bores are not blocked and uniform granules of high quality are obtained.

Although an important parameter in the process according to the invention is the extrusion pressure, even more important is the power consumed, i.e. the input of energy into the molding compound, because the molding compound loses viscosity at relatively high throughputs, so that the pressure in the extruder increases only slightly. The energy consumed depends upon the formulation and the shear stability of the molding compound. The power consumption during extrusion in the process-according to the invention is between 0.005 and 1 kW per Kg, preferably between 0.01 and 0.8 kW per Kg and, more preferably, between 0.02 and 0.08 kW per kg extrudate. In another embodiment, the extrusion pressure is in the range from 25 to 250 bar and, more particularly, in the range from 50 to 200 bar.

Another important parameter is the temperature of the molding compound in the extruder. A distinction has to be drawn in this regard between molding compounds which contain temperature-sensitive substances and molding compounds which do not. Under the effect of the energy introduced during extrusion, the temperature of the molding compound increases so that molding compounds of the first type have to be cooled to prevent destruction. In addition, it is advisable to cool the strands of molding compound immediately as they leave the bores, more particularly with cold air, in order partly to remove surface water from the pellets formed. In this way, the still plasticized pellets can be safely prevented from adhering to one another in this step of the process. Accordingly, extrusion is carried out at compound temperatures of 25° to 75° C. and preferably in the range from 30° to 70° C. and the plasticized strands issuing from the bores are at least surface-cooled and dried by shock cooling, particularly with cold air, before and/or during their size reduction.

Another problem is the uniform distribution of the compound to be molded over the entire cross-section of the molding plate of the granulation head containing the nozzle-like bores. The problem is particularly serious when the cross-section of the molding plate, for example containing 3,000 to 6,000 bores, is considerably larger than the cross-section of the discharge opening for the molding compound at the end of the extrusion screw. If the molding compound to be processed is not uniformly distributed over the entire cross-section of the molding plate, it emerges from the individual openings at different rates. Accordingly, the issuing strands are cut into granules of different length by the blade rotating in front of the molding plate so that a uniform product cannot be obtained. This pressure distribution problem does not arise in the case of extrusion from the melt, for example in the extrusion of plastics, because the pressure is uniformly distributed in liquids, but only in the case of solids like the molding compound to be processed in accordance with the invention, which, although plasticized, is so solid that it does not flow under the effect of forces weaker than the force of gravity.

Although a machine for granulating a plastic molding compound comprising a granulation head which adjoins an extruder and which comprises several bores at its outlet end and, on the extruder side, a preliminary distributor in the form of a perforated plate arranged at a distance from the extrusion screw and the bores is known from DE-OS 25 57 166, only a few and at most about 20 bores are provided in the known granulation head, so that the above-mentioned problem of uniform distribution of the molding compound does not arise. In the known machine, the molding compound is uniformly distributed simply because all the bores are arranged symmetrically to one another and at the same distance from the central axis of the machine.

By contrast, the present invention seeks to enable the molding compound which is to be processed to be uniformly distributed over the entire cross-section of the molding plate, even when the cross-section of the molding plate is considerably larger than the cross-section of the discharge opening for the molding compound at the end of the extrusion screw. Accordingly, the molding compound is extruded through the bores past a distributor, also known as a displacement cone, which is arranged inside the granulation head of the extruder at a distance from the extrusion screw and of which the tip points towards the extrusion screw.

According to the invention, the length-to-diameter ratio of the granules is the same over the entire cross-section of the granulation head.

In addition, uniform distribution of the molding compound is promoted by a baffle plate which is arranged in front of the distributor on the extruder side and of which the axial bore increases in diameter substantially from the diameter of the extrusion screw to substantially the diameter of the granulation head. Under the effect of this baffle plate, the molding compound follows a regular path through the distributor to the capillary bores.

Although the granules can be economically produced by means of an extruder preceded by a typical perforated plate, the small dimensions of the granules and the need for economy lead to a relatively large perforated plate with a very large number of relatively small bores. Accordingly, the high pressures required in this process cause the perforated plate to bend outwards so that advantageous transverse hot cutting of the strands as they leave the bores is complicated or even prevented. To solve this problem, the bores are arranged in perforated disks, particularly of ceramic, which are held by a carrier plate.

By virtue of the fact that, instead of a single perforated plate, numerous individual perforated disks are provided in a single carrier plate, only a relatively small force is applied to each of the perforated disks and the carrier plate as a whole with its perforated disks does not bend under high pressure. This enables a rotating blade or any other suitable cross-cutting unit to be arranged immediately after the outlet. In addition, economy is increased because the bores normally wear so that the perforated plate as a whole with its numerous individual bores has to be replaced. According to the invention, however, only individual low-cost perforated disks need be replaced.

The perforated disks may consist of metal, although ceramic is preferred because it provides for a longer useful life through lower abrasion and also for higher extrusion rates and, hence, higher throughputs by virtue of the smoother surface. Although ceramic perforated disks are more expensive than metal perforates disks, their useful life is more than 5 times longer.

In another embodiment, the perforated disks on the outlet-end face of the carrier plate are arranged in perforated-disk holders in the form of bores. Because the molding compound is extruded first through the perforated-disk holder and only then through the bores in the perforated disk, the pressure in the perforated-disk holder is equalized to such an extent that the pressure in the bores is the same over the entire perforated disk so that a uniform product is obtained.

In order further to improve pressure equalization within the molding compound, the molding compound is extruded through a preliminary distributor arranged between the distributor and the carrier plate inside the granulation head of the extruder. The preliminary distributor provides for pressure equalization between the individual perforated disks.

In order to avoid disturbances in the flow of the molding compound in the vicinity of the distributor, the inner surfaces of the baffle plate are provided solely with rounded edges.

To enable the molding compound to flow uniformly from the extrusion screw between the baffle plate and the distributor, the distance between that face of the distributor which faces the extruder and the opposite inner face of the baffle plate is substantially constant. A more uniform flow also provides for more uniform distribution of the molding compound over the cross-sectional area of the preliminary distributor facing the extruder.

In order to ensure that the pressures under which the molding compound is pressed into the bores of the preliminary distributor differ only minimally from one another, the distances which the molding compound to be granulated has to travel to the perforated-disk holders of the carrier plate situated closest to and furthest from the longitudinal axis of the granulation head are substantially the same.

In addition, to ensure that the molding compound is introduced into the bores of the preliminary distributor under a uniform pressure, it is favorable if the distance between the outer cross-sectional area of the preliminary distributor on the extruder side and the opposite face of the distributor is at least 3% of the diameter of the preliminary distributor.

To ensure that a high throughput is obtained where carrier plates of constant diameter are used, the perforated disks are distributed substantially over the entire carrier plate, more particularly in several concentric rows.

Alternatively, the perforated disks may be arranged on the carrier plate in only one outer circular row. Although the throughputs are smaller in this case, so also are the above-mentioned problems with pressure distribution.

Instead of a carrier plate with individual perforated disks arranged therein, it is also possible in accordance with the invention for the bores to be directly arranged in a single perforated plate, more particularly in several concentric rows. In this case, however, the above-mentioned problem of possible bending of the perforated plate must be taken into account. Accordingly, it is of particular advantage if, in this case, the bores are substantially arranged only at the outer edge of the perforated plate because the perforated plate would then show a constant bulge, if any, in the vicinity of the bores. Bulging is completely avoided if the perforated plate is in the form of a perforated ring connected to the granulation head at its inner and outer edges.

The problem of bulging does not arise in the embodiment of the invention described further above if a carrier plate and separate perforated disks designed for insertion therein are provided because, in this case, the thickness of the carrier plate may assume virtually any value in accordance with the mechanical pressure requirements without, at the same time, determining the length of the capillary bore, the length of the capillary bores being determined solely by the thickness of the perforated disk which can be chosen independently of the carrier plate and the pressure acting thereon. This free choice is not of course available if the bores are directly arranged in the perforated plate without a carrier plate and separate perforated disks being provided. However, the invention also encompasses these alternatives.

BRIEF DESCRIPTION OF THE DRAWINGS

Embodiments of the invention are described in detail in the following with reference to the accompanying drawings, wherein.

Figure 1:
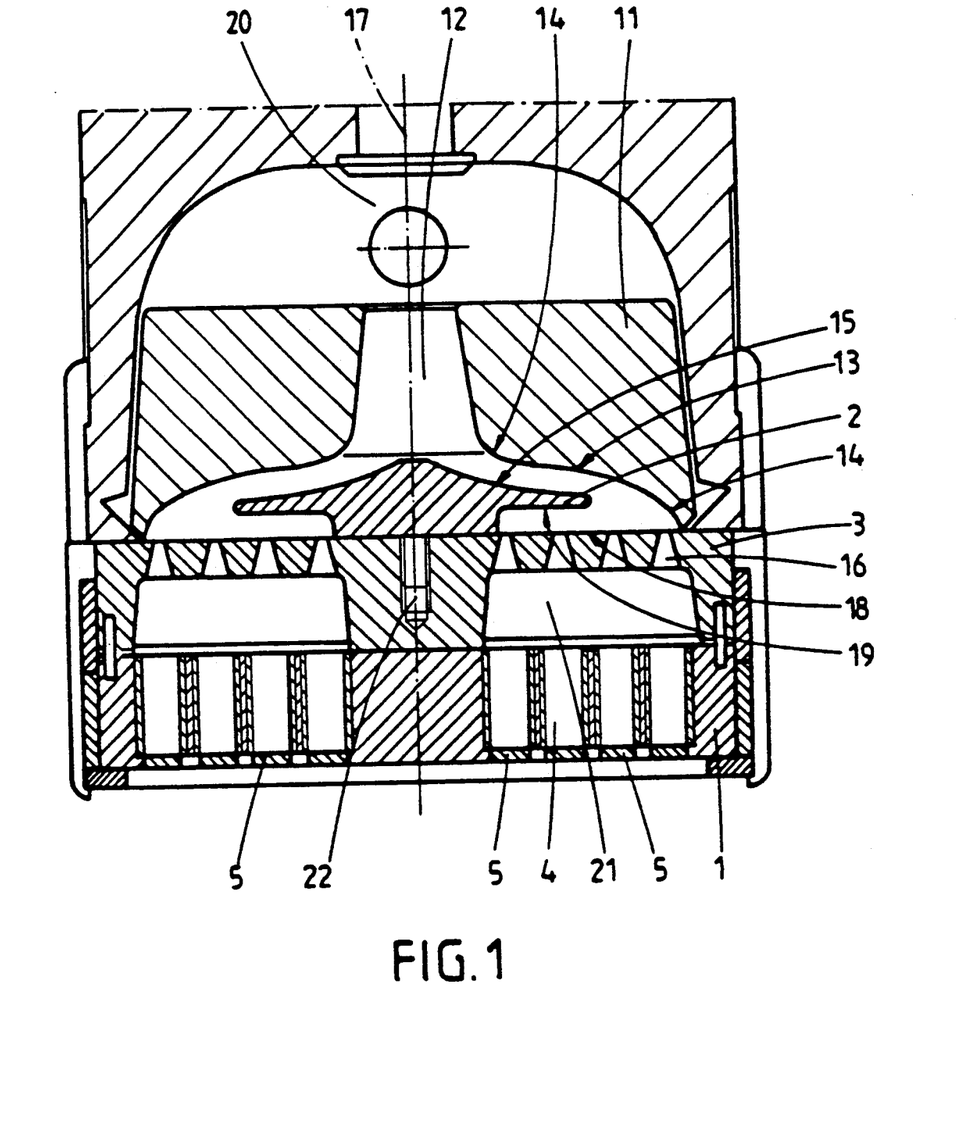
FIG. 1 is a longitudinal section through a granulation head of an extruder in a first embodiment of the invention.

FIG. 1 is a cross-section through a granulation head according to the invention. The longitudinal axis of the granulation head is denoted by the reference 17. The molding compound enters the granulation head at 20, passes through the baffle plate 11 an then flows along the baffle plate 11 and the displacement cone 2 to the rear cross-section 18 of the preliminary distributor 3. Through its openings, the bores 16, the molding compound is pressed into an empty space 21 between the preliminary distributor 3 and the carrier plate 1. The carrier plate 1 is referred to elsewhere as the molding plate. On its outlet-end face, it comprises a plurality of perforated disks 5 with bores 6 having a longitudinal section corresponding to FIG. 2. Arranged behind the carrier plate 1 is a rotating blade (not shown) which cuts the thin strands issuing into granules.

Figure 2:
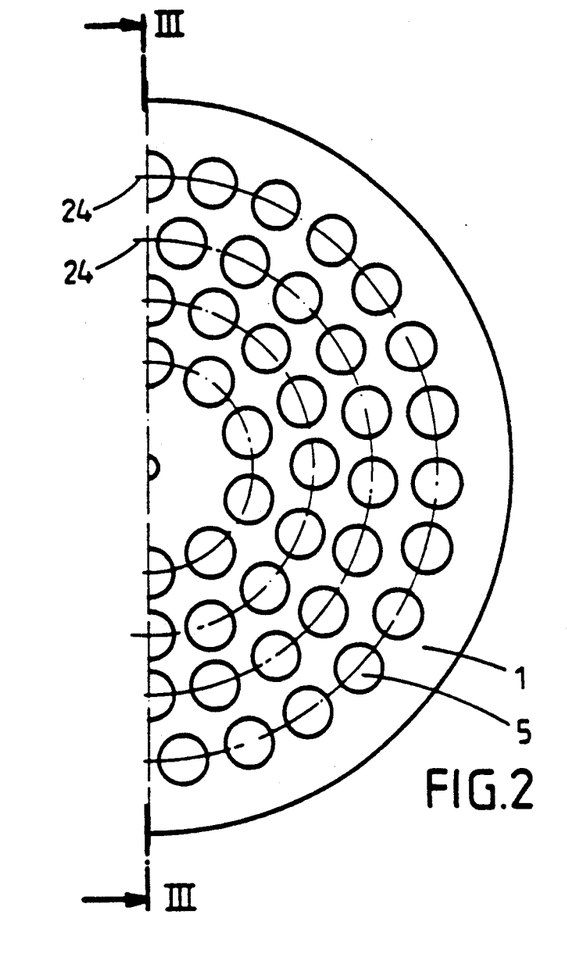
FIG. 2 is a plan view of the carrier plate of the granulation head shown in FIG. 1.

The carrier plate 1 comprises a plurality of bores 4 which are arranged in concentric circles around the longitudinal axis of the granulation head and at the outlet-end openings of which the perforated disks 5 are arranged. The illustrated carrier plate comprises, for example, 75 such bores 4 of which each is closed at its front end by perforated disks 5 each comprising, for example, 87 capillary-like bores 6. In this example, the diameter of the perforated disks 5 is 27 mm. The major advantage of the system of the carrier plate 1 with independent perforated disks 5 lies in the fact that, when the granulation head is increased or reduced in size, the perforated disks 5 are retained and only the size of the carrier plate 1 and the number of perforated disks 5 are changed without any scale-up problems.

Figure 3:
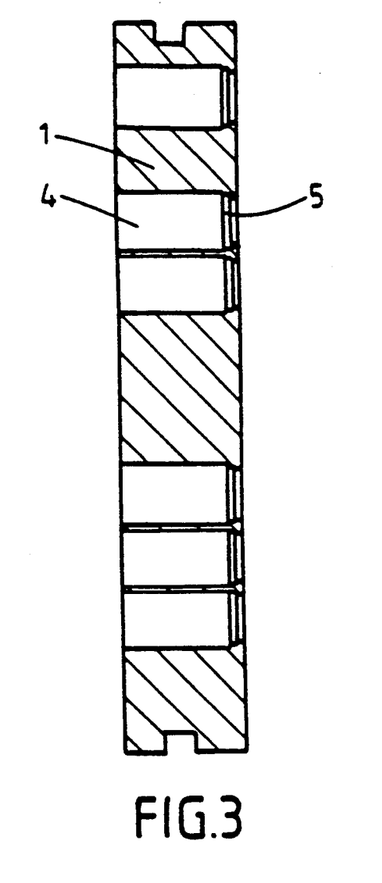
FIG. 3 is a longitudinal section through the carrier plate (on the line III—III in FIG. 2).
Figure 4:
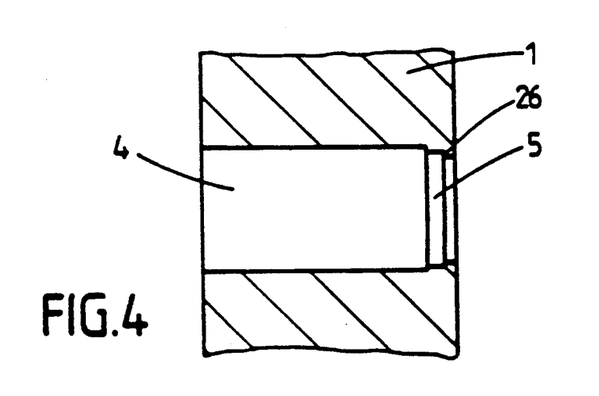
FIG. 4 shows a detail of FIG. 3 on a larger scale.

FIGS. 2 to 4 are respectively a plan view of and longitudinal section through the carrier plate of the granulation head shown in FIG. 1. The carrier plate 1 comprises several concentric perforated disks 5 distributed over the entire surface area of the carrier plate 1 in perforated-disk holders 4 in the form of bores. The bores 4 have a somewhat larger diameter on the extruder side than on the outlet side so that the perforated disks 5 are able to rest on the bearing surface 26 with their shoulder 27 shown in FIGS. 5 and 6.

Figure 5:
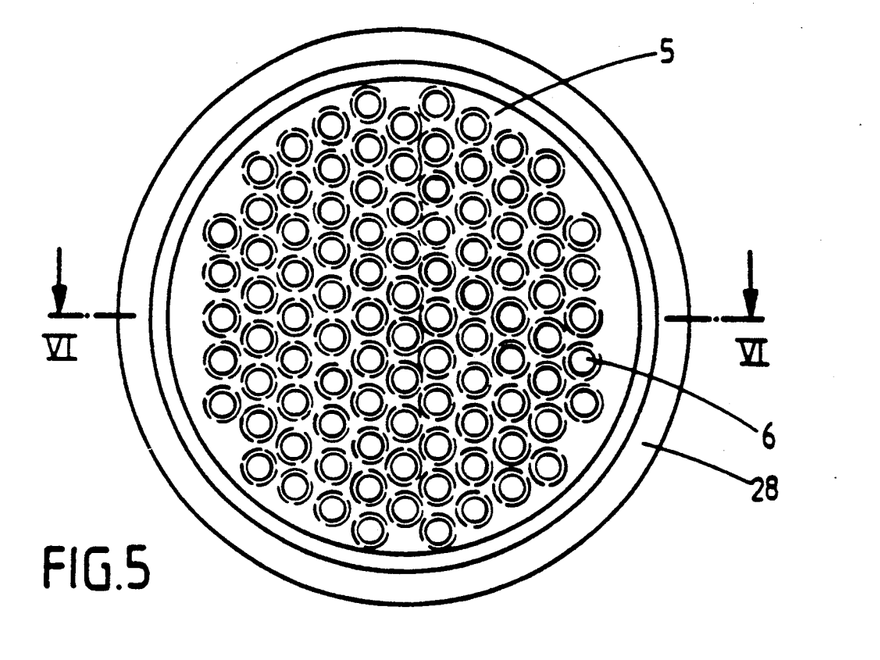
FIG. 5 is a plan view of the perforated disk belonging to the carrier plate.
Figure 6:
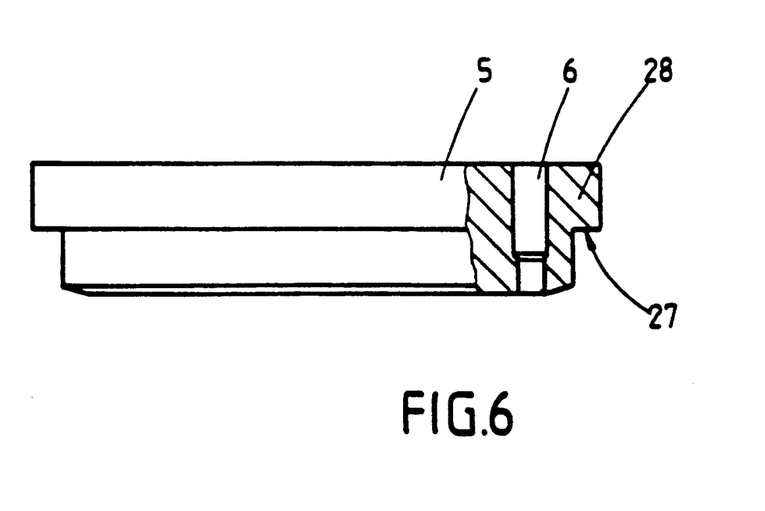
FIG. 6 is a partial section through the perforated disk (on line VI—VI in FIG. 5).

FIGS. 5 and 6 are respectively a plan view of and longitudinal section through a perforated disk 5 with bores 6. Through its encircling edge 28, the perforated disk 5 in the bore is supported by the carrier plate 1.

Figure 7:
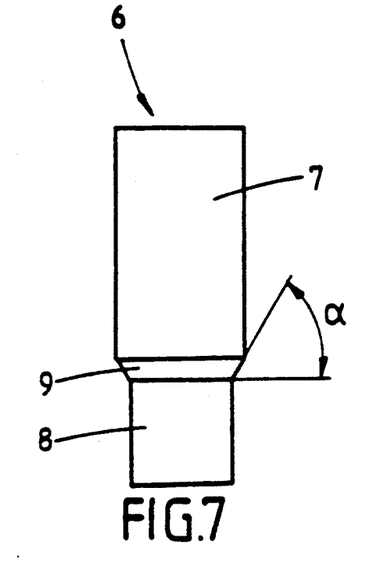
FIG. 7 is a longitudinal section through the bore in the perforated disk.
Figure 8:
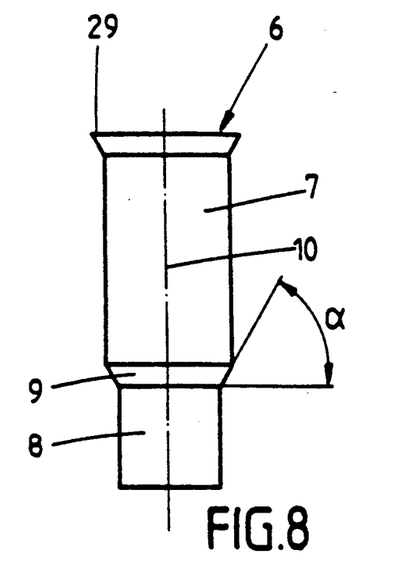
FIG. 8 is a longitudinal section through another embodiment of the bore.
Figure 9:
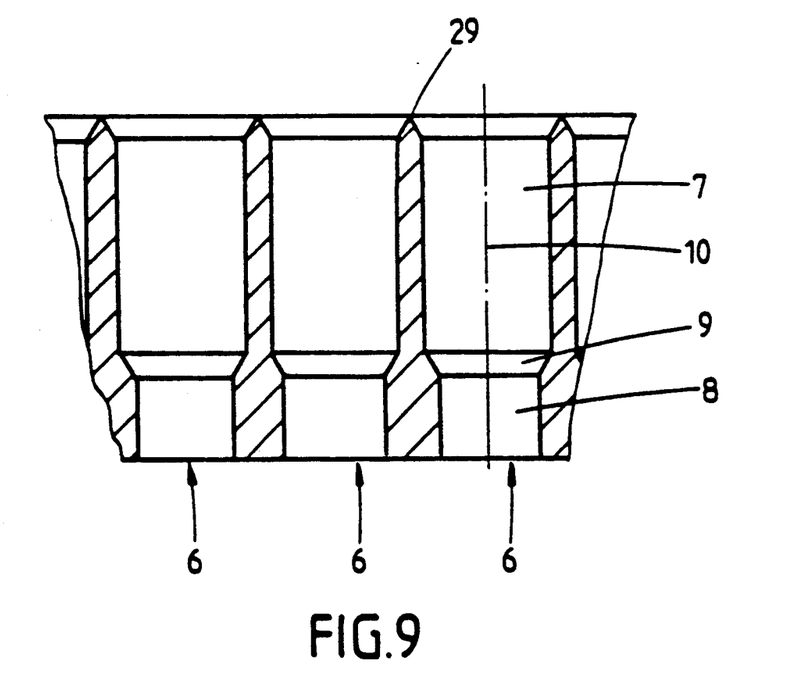
FIG. 9 is a longitudinal section through a number of bores.

In FIGS. 7 to 9, the bores 6 which taper outwards to form a kind of nozzle are shown with their inlet-end zones 7 and their front, narrow outlet-end zones 8.

In this example, the outlet-end zone 8 has a diameter of 0.9 to 1.2 mm and the inlet-end Zone 7 a diameter of 1.5 mm. The length of the outlet-end zone 8 is 1.4 mm while the length of the inlet-zone 7 is 4.5 mm. In the transition zone 9, the angle alpha of the wall relative to the surface transversely of the longitudinal axis 10 is 60°. With this bore, an extrusion rate of 4 to 10 cm/s is preferred whereas, with bores twice as thick, an extrusion rate of approximately 20 cm/s is preferred.

When the molding compound coming from the extruder flows through the axial bore 12, it impinges on the displacement cone 2 and flows between that face 15 of the displacement cone 2 which points towards the extruder and the opposite inner face 13 of the baffle plate 11 onto the cross-section 18 of the preliminary distributor 3 pointing towards the extruder. This passage should neither narrow nor widen. To ensure uninterrupted flow, the inner faces 13 of the baffle plate 11 are provided solely with rounded edges 14.

At the outer cross-sectional area 18 of the preliminary distributor 3 which is directed towards the extruder, the molding compound then enters the space 21 between the preliminary distributor 3 and the carrier plate 1 through the openings 16. That face of the displacement cone 2 which is opposite the outer cross-sectional area 18 of the preliminary distributor 3 is shown at 19.

The diameter of the plate as a whole is 30 to 45 cm or more. The displacement cone 2 is fixedly connected to the preliminary distributor 3 at 22 by a screwthread.

At its outer edge 29, the inlet-end zone 7 of the bores 6 shown in FIGS. 8 and 9 is chamfered outwards and the bores 6 are arranged so close to one another that the edges 29 touch. This reduces turbulence in the flowing molding compound under the effect of the webs remaining between the bores 6. If the edges 29 actually overlap, no webs with an end face extending perpendicularly of the longitudinal axis are present at all between the bores 6. In this case, the molding compound is virtually no longer decelerated when it impinges on the perforated disk, nor are any dead zones with non-flowing molding compound formed. No turbulence takes place either.

Figure 10:
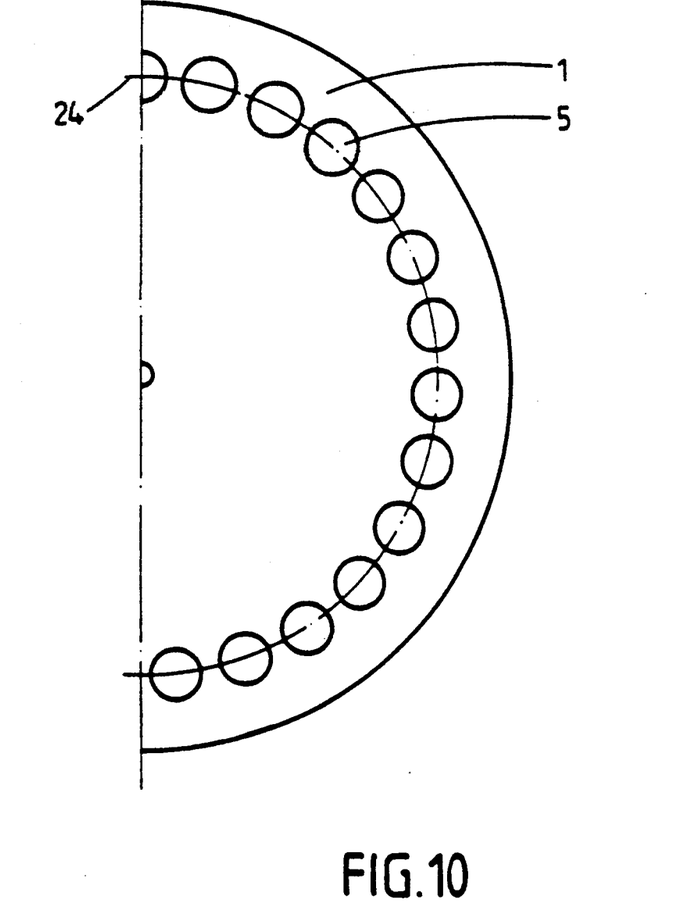
FIG. 10 is a plan view of a carrier plate in a second embodiment of the invention.

FIG. 10 is a plan view of another carrier plate 1 corresponding to another embodiment of the invention. In this case, the perforated disks are not arranged over the entire surface of the carrier plate 1, but only along a single row 24 close the edge of the carrier plate 1. In this case, the pressure distribution problem does not arise to the same extent as with the carrier plate shown in FIG. 2, although the throughput achieved is considerably lower. In this case, too, the bores in the perforated disks 5 are formed as shown in FIGS. 7 to 9. The perforated disk shown in FIG. 10 is also covered by the invention.

Figure 11:
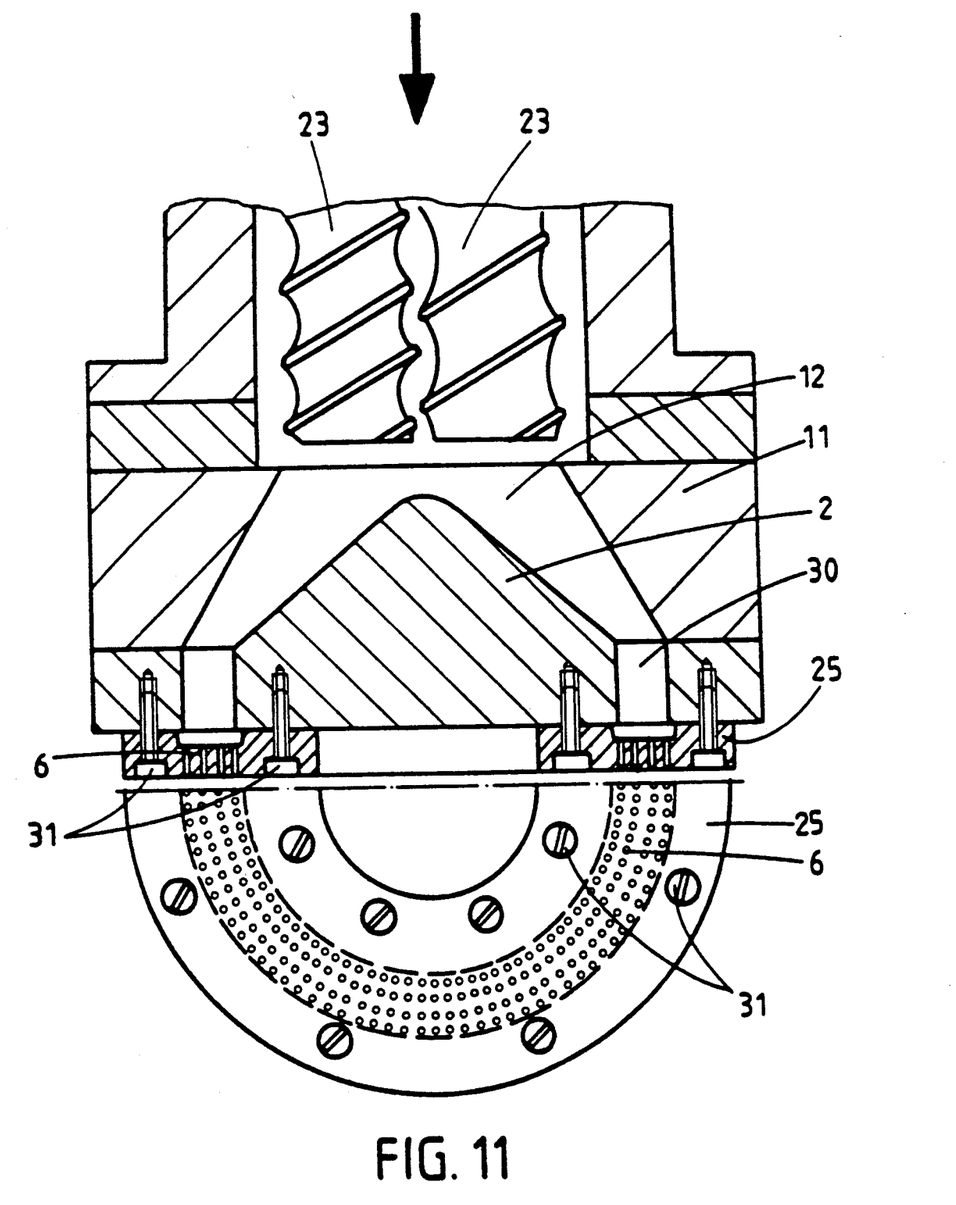
FIG. 11 is a partial section through a granulation head in a third embodiment of the invention.

FIG. 11 shows a granulation head corresponding to a third embodiment of the invention. The upper part of the Figure is a longitudinal section and the lower part a view from outside of the perforated ring 25. The molding compound is pressed by the extrusion screws 23 into the granulation head and, more particularly, into the space 12 between the baffle plate 11 and the displacement cone 2. From there, the molding compound flows through an annular passage 30 into the bores 6 in the middle part of the perforated ring 25 and emerges where the extrudates are then transversely size-reduced, for example by means of a rotating blade. In contrast to the previous embodiment of the invention, the embodiment shown in FIG. 11 does not use a disk-like carrier plate 1 with separate perforated disks 5 arranged therein, but instead a one-piece perforated ring 25 with bores 6 arranged therein. Outward arching of the perforated ring 25 is avoided by the fact that the perforated ring 25 is fixedly connected to the granulation head or rather to the displacement cone 2 by screws 31 both on its inside and on its outside. One advantage of this embodiment is that there are hardly any pressure distribution problems with the molding compound in the granulation head and the perforated ring 25 has considerably more bores than a corresponding carrier plate according to FIG. 10 with one outer row 24 of perforated disks 5.

A few numerical examples of perforated disks of the type shown in FIGS. 5 and 6 are presented in the following:

| Inlet-end zone 7 | | | | | |
|---|---|---|---|---|---|
| Diameter | 1.2 | 1.3 | 1.5 | 1.8 | 2.6 mm |
| Length | 5.3–4.8 | 5–4.5 | 4.8–4 | 5.0 | 5.0 mm |
| Outlet-end zone 8 | | | | | |
| Diameter | 0.7 | 1.0 | 1.2 | 1.4 | 2.0 mm |
| Length | 0.7–1.2 | 1–1.5 | 1.2–2 | 1.0 | 1.0 mm |
| Total wall thickness of perforated disk 5 | 6.0 | 6.0 | 6.0 | 6.0 | 6.0 mm |
| Number of bores 6 in perforated disk 5 (27 mm φ) | 121 | 96 | 96 | 54 | 19 |

Diameter of the perforated disk face on the extruder side, i.e. without the bearing surface 26: 20 to 25 mm
Number of perforated disks 5 in the carrier plate 1 shown in FIG. 2 (multi-ring arrangement)
Diameter of carrier plate 1: 300 mm 450 mm
Number of perforated disks 5 75 126
27 mm in diameter:

The process according to the invention was carried out with molding compounds according to Examples 1 to 9 described in the following.

EXAMPLES

Examples 1 to 5

To produce laundry detergents in the form of the storable free-flowing pellets according to the invention, two mixture components separately obtained beforehand are mixed together in the ratios shown in Table 1 and worked up.

The first component is a tower powder substantially free from nonionics based on the following principal components (figures represent % by weight)
  Surfactant mixture approx. 17.5%
  Calcined soda approx. 35%
  Zeolite NaA approx. 22%
  Acrylic acid copolymer (Sokalan ®) approx. 10%
  Water approx. 10%
  Remainder typical detergent auxiliaries The second component is a carrier bead of high nonionic surfactant content which is made up of the following principal components:
  Surfactant mixture approx. 22%

Zeolite NaA approx. 55%
Acrylic acid copolymer (Sokalan ®) approx. 3%
Water approx. 15%
Remainder sodium sulfate and other typical auxiliaries.

In the process described in detail in the following, the two mixture components are size-reduced and mixed, after which the necessary quantity of water and the quantity shown in Table 1 of 55% aqueous alkyl benzene sulfonate paste are pumped in. Finally, sodium perborate monohydrate is added in Examples 1 to 3, followed by brief mixing.

The free-flowing material thus formed is then subjected to homogenizing compaction and plasticization. The compound formed is extruded to form a strand, chopped into cylindrical granules, rounded and dried.

The individual process steps are described in detail in the following:

Preparation of Premix

The tower powder (TP)/carrier bead (CB) from production is introduced into a batch mixer (20 liters) equipped with a cutter head granulator and mixed for about 0.5 min. With both the mixer and the cutter head granulator in operation, the quantity of water required and then the entire ABS paste are pumped in through a slot nozzle (approx. 2.5 mins.). Finally, the total quantity of Na perborate monohydrate is added if necessary, followed by mixing for approx. 1 minute. The resulting premix is free-flowing and may be used to charge the continuous kneader/extruder.

Kneader/Extruder Granulation

The premix obtained is continuously delivered to a twin-screw kneader/extruder of which the housing, including the extruder granulation head, is heated to approx. 45° to 50° C. Under the shearing effect of the extrusion screws, the premix is plasticized and subsequently extruded through the extruder head perforated disks to form fine strands (1.0 and 1.2 mm in diameter) which, after leaving the perforated disks, are size-reduced to cylindrical pellets (length-to-diameter ratio approx. 1:1) by means of a cutter.

By blowing cold air into the vicinity of the granulation blade, the granules are cooled to approx. 40° to 45° C. and, at the same time, surface water is removed to prevent the pellets from adhering to one another.

Rounding

The moist granules coming from the extruder/granulator are rounded and smoothed continuously or in batches in a commercial rounding machine of the Marumerizer type with addition of zeolite Na powder as the powdering agent.

The desired degree of rounding is established by varying the residence time of the granules in the rounding machine and the rotational speed of the machine disk.

Drying of the Granules

The moist granules from the rounding machine are dried in a discontinuous fluidized-bed dryer at an inflowing air temperature of approx. 75° to 80° C. up to a product temperature of approx. 55° to 60° C. Free-flowing granules are obtained after cooling to approx. 30° C. with cold air.

Sieving of the Granules

The very low-dust product is sieved through a 1.6mm mesh sieve. In every case, the fraction larger than 1.6 mm in size was at most 3%. The accepts are used as starting material for the blending of detergent end products.

TABLE 1

| Extrudable premixes | 1 | 2 | 3 | 4 | 5 |
|---|---|---|---|---|---|
| Composition | | | | | |
| Tower powder (% by weight) | 50.3 | 50.3 | 51.12 | 60.91 | 62.6 |
| Carrier bead | 23.1 | 23.1 | 23.47 | 28.0 | 28.7 |
| Na perborate monohydrate | 16.0 | 16.0 | 16.27 | — | — |
| ABS paste, 55% | 8.55 | 8.55 | 4.06 | 8.57 | 4.19 |
| Water (deionized) | 2.1 | 2.1 | 5.08 | 2.54 | 4.5 |
| Extrusion conditions | | | | | |
| Extruder pressure (bar) | 100 | 115 | 80 | 107 | 95 |
| $\phi$ Bores 6, perforated disk (mm) | 1.2 | 1.0 | 1.2 | 4.0 | 1.2 |
| Extruder throughput (kg/h) | 60 | 55 | 50 | 47 | 40 |
| Product discharge temperature (°C.) | 53 | 50 | 46 | 43.5 | 41 |
| Batch rounding | | | | | |
| Batch time (mins.) | 1 | 1 | 1 | 1 | 1 |
| Peripheral speed of rotor (m/s) | 30 | 30 | 30 | 30 | 30 |
| Zeolite NaA powder (% by weight) | 3.0 | 3.0 | 3.0 | 3.0 | 3.0 |
| Fluidized bed drying | | | | | |
| Inflowing air temperature (°C.) | 75 | 75 | 75 | 75 | 75 |
| Max. product temp. (°C.) | 60 | 60 | 60 | 60 | 60 |
| Seiving | | | | | |
| Accepts, yield | 97 | 97 | 97 | 97 | 97 |
| Accepts, apparent density | 950 | 960 | 910 | 890 | 910 |

Example 6

Following the procedure of Examples 1 to 5, 2.5% by weight water, 5% by weight nonionic surfactant based on fatty alcohol ethoxylate (Dehydol LST 80/200) and 4% by weight 55% ABS Na paste are added to a nonionic-free tower powder (ABS approx. 9%, calcined soda approx. 25%, zeolite NaA approx. 38%, acrylic acid copolymer approx. 8%, water approx. 15%, remainder typical detergent constituents) used in a quantity of 88.5% by weight.

Working up gives storable, free-flowing spherical granules in which the accepts have apparent densities of 900 to 950.

Example 7

If a mixture of tower powder and carrier bead is worked up in the same way as in Examples 1 to 5, but with a 40% solution of the acrylic acid copolymer (Sokalan CP 5 ®) in a quantity of approx. 4.5% by weight as plasticizer and with addition of more water (approx. 6% by weight) for plasticization, storable, free flowing and, at the same time, readily water-soluble spherical granules are again obtained.

Example 8

The following mixture components are used in accordance with the teaching of Examples 1 to 5:

Free-flowing tower powder based on the following principal components: approx. 22% surfactant mixture, approx. 2.5% tallow-based Na soap, approx. 15% calcined soda, approx. 7% waterglass, approx. 26.5% zeolite NaA, approx. 7.5% acrylic acid copolymer, approx. 12% water, remainder typical additives.

Carrier bead rich in nonionics based on the following principal components: approx. 22% surfactant mixture, tallow-based Na soap approx. 2%, zeolite NaA approx. 55%, acrylic acid copolymer approx. 3%, water approx. 15%.

Approx. 11% (based on the mixture as a whole) of 60% ABS paste is added to and homogenized with the material size-reduced and mixed in accordance with Examples 1 to 5. The material formed is compacted and plasticized by kneading and extruded. Storable, free-flowing, pourable and readily dispensable spherical granules having apparent densities of 900 to 950 g/l are obtained.

Example 9

A phosphate-free and pH-neutral special-purpose detergent partial tower powder of substantially the following composition: surfactant mixture 16%, soap 2.8%, zeolite 16.0%, Sokalan CP 5® 3.2%, $Na_2SO_4$ 58%, remainder typical minor components, is intensively mixed with 5% by weight ABS paste (40%) and is then plasticized in an extruder and subsequently extruded through a perforated disk with 1.2 mm bores. By controlling the temperature of the housing, the temperature is regulated in such a way that product temperatures of 45° to 50° C. are established. The compacted strands issuing from the perforated disk are cut up by a rotating blade to form cylindrical particles having a length-to-diameter ratio of approx. 1. The still warm particles are rounded in a Marumerizer with addition of approx. 2% zeolite NaA powder and dried in a fluidized-bed dryer as described above. Products having apparent densities of about 850 to 920 g/l are obtained after drying, the particular apparent density being dependent upon the degree of rounding.

Working up with approx. 3% minor detergent components of the type typically used in practice (fragrance, enzyme, optionally color specks) does not significantly affect the apparent densities.

List of Reference Numerals

1 = Carrier plate
2 = Displacement cone
3 = Preliminary distributor
4 = Perforated-disk holder
5 = Perforated disks
6 = Bore
7 = Inlet-end zone
8 = Outlet-end zone
9 = Transition zone
10 = Longitudinal axis of bores
11 = Baffle plate
12 = Axial bore in baffle plate
13 = Inner faces
14 = Edges
15 = Face
16 = Bore in preliminary distributor
17 = Longitudinal axis
18 = Cross-sectional area
19 = Face
20 = -
21 = Empty space
22 = -
23 = Extrusion screw
24 = Rows
25 = Perforated plate, perforated ring
26 = Bearing surface
27 = Shoulder
28 = Encircling edge
29 = Edge
30 = Annular passage
31 = Screws

We claim:

1. A process for the production of a granulated detergent product from a mixture of at least partly solid fine particles which comprises: adding at least one additive selected from the group consisting of plasticizers and lubricants to the mixture to form a particulate free flowing premix, extruding the premix containing the additive in an extruder under a pressure of at least 25 bar through a plurality of bores (6) which have an inlet-end zone (7) of a relatively large diameter and an outlet-end zone (8) of a smaller diameter, a length-to-diameter ratio in the inlet-end zone (7) being between 1.5 :1 and 6:1 and, a length-to-diameter ratio in the outlet-end zone (8), being between 0.3:1 and 2:1 and cutting the issuing strands transversely to a predetermined length immediately after leaving the bores.

2. A process as claimed in claim 1, wherein the inlet-end zone (7) of the bores (6) is conically chamfered towards the inlet.

3. A process as claimed in claim 2, wherein edges (29) of the adjacent bores (6) at the inlet end touch or intersect one another.

4. A process of claim 1 wherein a transition zone (9) between the inlet-end zone (7) and the outlet-end zone (8) of the bores (6) is inclined at an angle of 20° to 85° towards a plane perpendicular to the longitudinal axis (10) of the bores (6).

5. A process of claim 1 wherein the diameter of the outlet-end zone (8) of the bores (6) is between 0.5 and 5 mm.

6. A process of claim 1 wherein the diameter of the inlet-end zone (7) of the bores (6) is from 0.8 to 4 mm.

7. A process of claim 1 wherein the power consumed during extrusion amounts to between 0.005 and 1 kW per kg of granulated detergent.

8. A process of claim 1 wherein extrusion is carried out under a pressure of 25 to 250 bar.

9. A process of claim 1 wherein extrusion is carried out at a temperature of the mixture containing the additive of 25° to 75° C. and cooling the issuing plasticized strands with cold air.

10. A process of claim 1 wherein the molding compound is extruded past a first distributor (2) arranged at a distance from an extrusion screw in a granulation head of the extruder the distributor having a cone tip pointing towards the extrusion screw (23) before being extruded through the bores (6).

11. A process of claim 10, wherein a baffle plate (11) is arranged in front of the first distributor (2) on the extruder side the baffle plate having an axial bore (12) which increases in diameter from a diameter equivalent to the diameter of the extrusion screw to substantially the diameter of the granulation head.

12. A process of claim 1 wherein the bores (6) are arranged in perforated disks (5) which are held by a carrier plate (1).

13. A process of claim 12, wherein the perforated disks (5) on an outlet-side face of the carrier plate (1) are arranged in perforated-disk holders (4) in the form of bores.

14. A process of claim 12 wherein the molding compound is extruded through a preliminary distributor (3), arranged between a first distributor (2) and the carrier plate (1) inside a granulation head of the extruder.

15. A process of claim 11 wherein inner faces (13) of the baffle plate (11) solely comprise rounded edges (14).

16. A process of claim 15 wherein the distance between that face (15) of a distributor (2) which faces in the direction of the extruder and an adjacent inner face (13) of the baffle plate (11) is substantially constant.

17. A process of claim 13 wherein a distance which a molding compound to be granulated travels to the perforated-disk holders (4) of the carrier plate (1) positioned closest to and furthest from a longitudinal axis (17) of the granulation head are substantially the same.

18. A process of claim 14 wherein a distance between an outer cross-sectional area (18) of a preliminary distributor (3) on the extruder side and a face (19) of a first distributor situated opposite the face (18) is at least 3% of the diameter of the preliminary distributor (3).

19. A process of claim 12 wherein the perforated disks (5) are distributed substantially over the entire carrier plate (1), in several concentric rows (24).

20. A process of claim 12 wherein the perforated disks (5) are arranged in only one outer circular row (24) on the carrier plate (1).

21. A process of claim 1 wherein the bores (6) are arranged in a perforated plate (25), in several concentric rows.

22. A process of claim 21, wherein the bores (6) are arranged only at the outer edge of the perforated plate (25).

23. A process of claim 22, wherein the perforated plate (25) is in the form of a perforated ring (25) connected to the granulation head at its inner and outer edges.

24. A process of claim 4 wherein the transition zone is inclined at an angle of from 40° to 80°.

25. A process of claim 4 wherein the transition zone is inclined at an angle of from 45° to 75°.

26. A process of claim 5 wherein the diameter of the outlet-end zone is between 1 mm and 2.5 mm.

27. A process of claim 6 wherein the diameter of the inlet-end zone of the bores is between 1.2 mm and 3 mm.

28. A process of claim 7 wherein the power consumed is between 0.01 and 0.8 KW per Kg.

29. A process of claim 28 wherein the power consumed is between 0.02 and 0.08 KW per Kg.

30. A process of claim 9 wherein the extrusion is carried out at a temperature of from 30° to 70° C.

* * * * *